US008776200B2

(12) United States Patent
Ryu

(10) Patent No.: US 8,776,200 B2
(45) Date of Patent: Jul. 8, 2014

(54) METHOD FOR INPUTTING A PASSWORD INTO AN ELECTRONIC TERMINAL

(76) Inventor: JongBin Ryu, Seoul (KR)

( * ) Notice: Subject to any disclaimer, the term of this patent is extended or adjusted under 35 U.S.C. 154(b) by 0 days.

(21) Appl. No.: 14/004,820

(22) PCT Filed: Feb. 10, 2012

(86) PCT No.: PCT/KR2012/001012
§ 371 (c)(1),
(2), (4) Date: Sep. 12, 2013

(87) PCT Pub. No.: WO2012/124898
PCT Pub. Date: Sep. 20, 2012

(65) Prior Publication Data
US 2014/0013408 A1 Jan. 9, 2014

(30) Foreign Application Priority Data
Mar. 14, 2011 (KR) .................. 10-2011-0022527

(51) Int. Cl.
| G06F 21/00 | (2013.01) |
| G06F 21/36 | (2013.01) |
| H04L 29/06 | (2006.01) |
| G06F 3/023 | (2006.01) |
| G06F 3/0488 | (2013.01) |
| H04W 12/06 | (2009.01) |

(52) U.S. Cl.
CPC .............. *G06F 21/36* (2013.01); *H04L 63/083* (2013.01); *G06F 3/0236* (2013.01); *G06F 3/0488* (2013.01); *H04W 12/06* (2013.01)
USPC .............................................. 726/7; 713/183

(58) Field of Classification Search
CPC ..... G06F 21/36; G06F 3/0236; G06F 3/0488; H04L 63/083; H04W 12/06
USPC ............................................. 726/7; 713/183
See application file for complete search history.

(56) References Cited

U.S. PATENT DOCUMENTS 6,209,102 B1 * 3/2001 Hoover ........................... 726/18
6,246,769 B1 * 6/2001 Kohut ............................. 380/45
(Continued)

FOREIGN PATENT DOCUMENTS

| JP | 2005-258838 A | 9/2005 |
| KR | 10-2005-0090102 A | 9/2005 |
| KR | 10-2010-0011084 A | 2/2010 |

*Primary Examiner* — Michael Pyzocha
(74) *Attorney, Agent, or Firm* — KORUS Patent, LLC; Seong Il Jeong

(57) ABSTRACT

The present invention relates to a method for inputting a password into an electronic terminal, wherein the method comprises: a step of saving a password character string inputted by the user through an input unit in a storage unit; a step of randomly placing adjacent characters from within the password character string into adjacent input buttons—defined as any two input buttons connected in a straight line without passing another input button—which are arranged in a two-dimensional field by a control unit, wherein the total number of input buttons is greater than the number of characters included in the password character string; a step in which the control unit places a character not included in the password character string into an input button in which a character included in the password character string has not been placed; a step in which a display unit displays each input button displaying a placed character; a step in which an input unit receives the input character string from the user; and a step in which the control unit completes the user authentication procedure when the password character string and the input character string are the same.

8 Claims, 6 Drawing Sheets

(56) References Cited

U.S. PATENT DOCUMENTS

| | | | |
|---|---|---|---|
| 6,549,194 B1* | 4/2003 | McIntyre et al. | 345/173 |
| 7,484,173 B2* | 1/2009 | Gao et al. | 715/741 |
| 7,562,227 B1* | 7/2009 | Cox et al. | 713/183 |
| 7,992,007 B2* | 8/2011 | Lazzaro et al. | 713/183 |
| 8,334,845 B2* | 12/2012 | Liu | 345/168 |
| 8,353,017 B2* | 1/2013 | Cerruti et al. | 726/5 |
| 2002/0109677 A1* | 8/2002 | Taylor | 345/173 |
| 2005/0254650 A1* | 11/2005 | Sakurai et al. | 380/268 |
| 2006/0053301 A1* | 3/2006 | Shin | 713/183 |
| 2009/0284344 A1* | 11/2009 | Craymer et al. | 340/5.54 |
| 2009/0307768 A1* | 12/2009 | Zhang et al. | 726/19 |
| 2009/0327114 A1* | 12/2009 | Sheth et al. | 705/35 |
| 2010/0031200 A1* | 2/2010 | Chen | 715/863 |
| 2012/0011370 A1* | 1/2012 | Duke | 713/183 |

* cited by examiner

METHOD FOR INPUTTING A PASSWORD INTO AN ELECTRONIC TERMINAL

TECHNICAL FIELD

The present invention relates to a method for inputting a password and, more particularly, to a method for receiving a password from a user in order to perform user authentication in an electronic terminal.

BACKGROUND ART

Recently, various types of personal electronic terminals have been popularized. Such personal electronic terminals are provided with functions of performing the transmission and reception of a user's e-mails and other messages, schedule and address directory management and the storage and management of various files that require security in terms of business. Furthermore, personal electronic terminals have excellent portability, and thus it is essential to identify genuine users and to allow the use thereof only to authenticated users.

A password input-type authentication method that is provided by personal electronic terminals in order to perform authentication is problematic in that a probability of exposing a password to another person located adjacent to a user is very strong. In particular, although there is the case where characters that a user inputs are directly exposed to another person, the case in which another person easily infers a password from the locations and input pattern of individual characters frequently occurs. Furthermore, since a password input method that is intended to overcome the above problems should maximize security and take into consideration the convenience of user input, an appropriate alternative has not been proposed for a long period of time.

DISCLOSURE

Technical Problem

Accordingly, the present invention has been made keeping in mind the above problems occurring in the prior art, and an object of the present invention is to provide a method for inputting a password into an electronic terminal, in which an array of password input buttons is randomly arranged and a user's password is arranged adjacently, thereby maximizing security and also minimizing a user input time and the line of movement of input work.

Another object of the present invention is to provide a method for inputting a password into an electronic terminal, which makes an input pattern be randomly formed whenever a password is input, thereby preventing another person from easily inferring a password.

A further object of the present invention is to provide a method for inputting a password into an electronic terminal, which erases the characters of one or more input buttons that have been pressed, thereby preventing another person from easily inferring a password.

Yet another object of the present invention is to provide a method for inputting a password into an electronic terminal, which randomly arranges input buttons whenever a password is input and also displays the characters of the input buttons only for a minimum period of time, thereby preventing another person from easily inferring a password when buttons are pressed.

Still another object of the present invention is to provide a method for inputting a password into an electronic terminal, which sets various lengths and types of graphs that may be included in an array of input buttons in advance, selects one from among various types of graphs corresponding to a corresponding length when characters are arranged on input buttons, then arranges the character string of a password on the graph, thereby rapidly displaying a random array of input buttons while using a minimum number of resources.

TECHNICAL SOLUTION

In order to accomplish the above objects, the present invention provides a method for inputting a password into an electronic terminal, including the steps of: (a) receiving, by an input unit, a character string of a password from a user, and storing the character string of the password in a storage unit; (b) randomly arranging, by a control unit, characters included in the character string of the password on two-dimensionally arranged input buttons wherein the number of the input buttons is larger than a number of characters included in the character string of the password, wherein adjacent characters in the character string of the password are arranged on adjacent input buttons—the adjacent input buttons being two input buttons that can be connected by a rectilinear line without intervention of another input button; (c) arranging, by the control unit, one or more characters that are not included in the character string of the password on the input buttons on which characters that are included in the character string of the password have not been arranged; (d) displaying, by a display unit, the input buttons on which the respective arranged character are indicated; (e) receiving, by the input unit, an input character string from a user; and (f) completing, by the control unit, a user authentication procedure if the character string of the password is identical to the input character string.

In the present invention, the character string of the password may include one or more repeated characters.

In the present invention, step (a) may include the step of storing, by the control unit, a surplus character string composed of characters that are not included in the character string of the password in the storage unit; step (c) may include arranging, by the control unit, characters included in the surplus character string on input buttons on which characters included in the character string of the password have not been arranged.

In the present invention, step (d) may include the step of erasing, by the display unit, characters indicated on all the input buttons when a predetermined time has elapsed after the input buttons are first displayed, and displaying the input buttons.

In the present invention, step (d) may include the step of erasing, by the display unit, characters indicated on all the input buttons when the input unit receives an input regarding a "hide button" from the user, and displaying the input buttons.

In the present invention, step (e) may include the step of receiving, by the input unit, the input character string from the user, and erasing, by the display unit, a character indicated on each of the input buttons corresponding to the input character string whenever the input button is pressed, and displaying the input buttons.

In the present invention, step (e) may include the step of erasing, by the display unit, characters indicated on all the input buttons when the input unit receives an input regarding a random input button from the user, and displaying the input buttons.

In the present invention, step (b) may include the step of selecting, by the control unit, any one from among a plurality of preset graph structures—each of the preset graph structures being included in a two-dimensional (2D) array including a number of input buttons larger than the number of characters included in the string of the password, and having the length of the number of characters included in the character string of the password; and the step of arranging, by the control unit, the characters included in the character string of the password on the selected graph structure, wherein adjacent characters in the character string of the password are arranged on adjacent input buttons—the adjacent input buttons being two input buttons that can be connected by a rectilinear line without intervention of another input button; and step (c) may include the step of, locating, by the control unit, the graph structure on the 2D array of input buttons; and the step of arranging, by the control unit, characters that are not included in the character string of the password on the input buttons on which the characters that are included in the character string of the password have not been arranged.

Advantageous Effects

According to the present invention, there is provided a method for inputting a password into an electronic terminal, in which an array of password input buttons is randomly arranged and a user's password is arranged adjacently, thereby maximizing security and also minimizing a user input time and the line of movement of input work.

Furthermore, the present invention provides a method for inputting a password into an electronic terminal, which makes an input pattern be randomly formed whenever a password is input, thereby preventing another person from easily inferring a password.

Furthermore, the present invention provides a method for inputting a password into an electronic terminal, which erases the characters of one or more input buttons that have been pressed, thereby preventing another person from easily inferring a password.

Furthermore, the present invention provides a method for inputting a password into an electronic terminal, which randomly arranges input buttons whenever a password is input and also displays the characters of the input buttons only for a minimum period of time, thereby preventing another person from easily inferring a password when buttons are pressed.

Moreover, the present invention provides a method for inputting a password into an electronic terminal, which sets various lengths and types of graphs that may be included in an array of input buttons in advance, selects one from among various types of graphs corresponding to a corresponding length when characters are arranged on input buttons, then arranges the character string of a password on the graph, thereby rapidly displaying a random array of input buttons while using a minimum number of resources.

MODE FOR INVENTION

Figure 1:
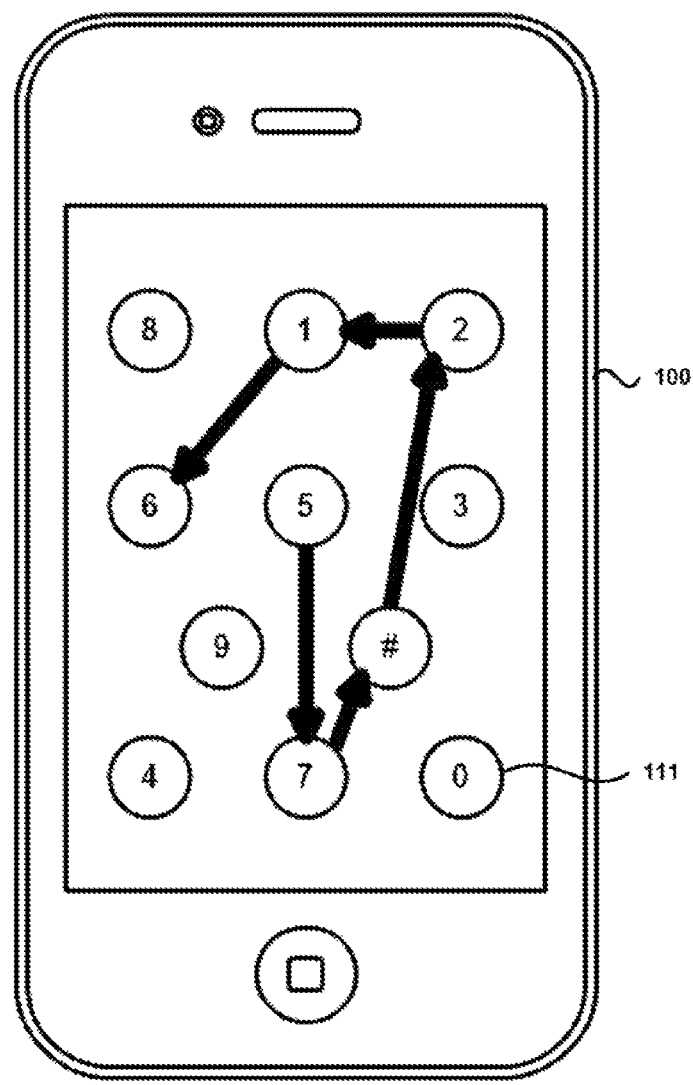
FIG. 1 is a diagram illustrating the screen of an electronic terminal to which a method for inputting a password into an electronic terminal according to the present invention has been applied.

Methods for inputting a password into an electronic terminal according to embodiments of the present invention will be described in detail with reference to the accompanying drawings. The advantages and features of the present invention and methods for achieving them will be apparent from the embodiments that will be described in detail below in conjunction with the accompanying drawings.

Meanwhile, the present invention is not limited to the embodiments to be disclosed below, but may be implemented in various different forms. The embodiments are provided merely to make the disclosure of the present invention complete and to make those having ordinary knowledge in the field of art to which the present invention pertains fully understand the scope of the present invention. The present invention will be defined only by the scope of the claims.

Throughout the specification, the same reference numerals designate the same components.

FIG. 1 is a diagram illustrating the screen of an electronic terminal 100 to which a method for inputting a password into an electronic terminal according to the present invention has been applied. The electronic terminal that is used to implement the method for inputting a password into an electronic terminal according to the present invention includes an input unit configured to receive input from a user, a storage unit configured to store data, a display unit configured to display information to the user, and a control unit configured to processes data received through the input unit and to execute the entire functionality of the electronic terminal by controlling the display unit, the input unit, and the storage unit. The input unit may be implemented as any device capable of recognizing physical information input from a user and converting the physical information into electrical data, such as a touchpad, a keypad, a mouse, a camera or the like. The storage unit is implemented as common memory, and the display unit is implemented as a common display device capable of representing electrical data in a form that can be physically identified, such as a monitor, a projector, or the like. The control unit includes a series of electric circuits and operating software, and may include a common Operating System (OS) and application programs. According to the present invention, a user may input a password when user authentication is required while using the electronic terminal 100. As illustrated in the drawing, the password may be input by a method of sequentially selecting a plurality of input buttons 111. That is, in the drawing, the user presses input buttons 111 corresponding to respective characters in order to input the password "5-7-#-2-1-6." The user's input time can be considerably reduced because input buttons to be pressed are located close to each other, and convenience can be also maximized because a finger for input does not need to be taken off the input unit in order to sequentially pass over the individual input buttons 111. Individual steps for the above operation will be described below.

Figure 2:
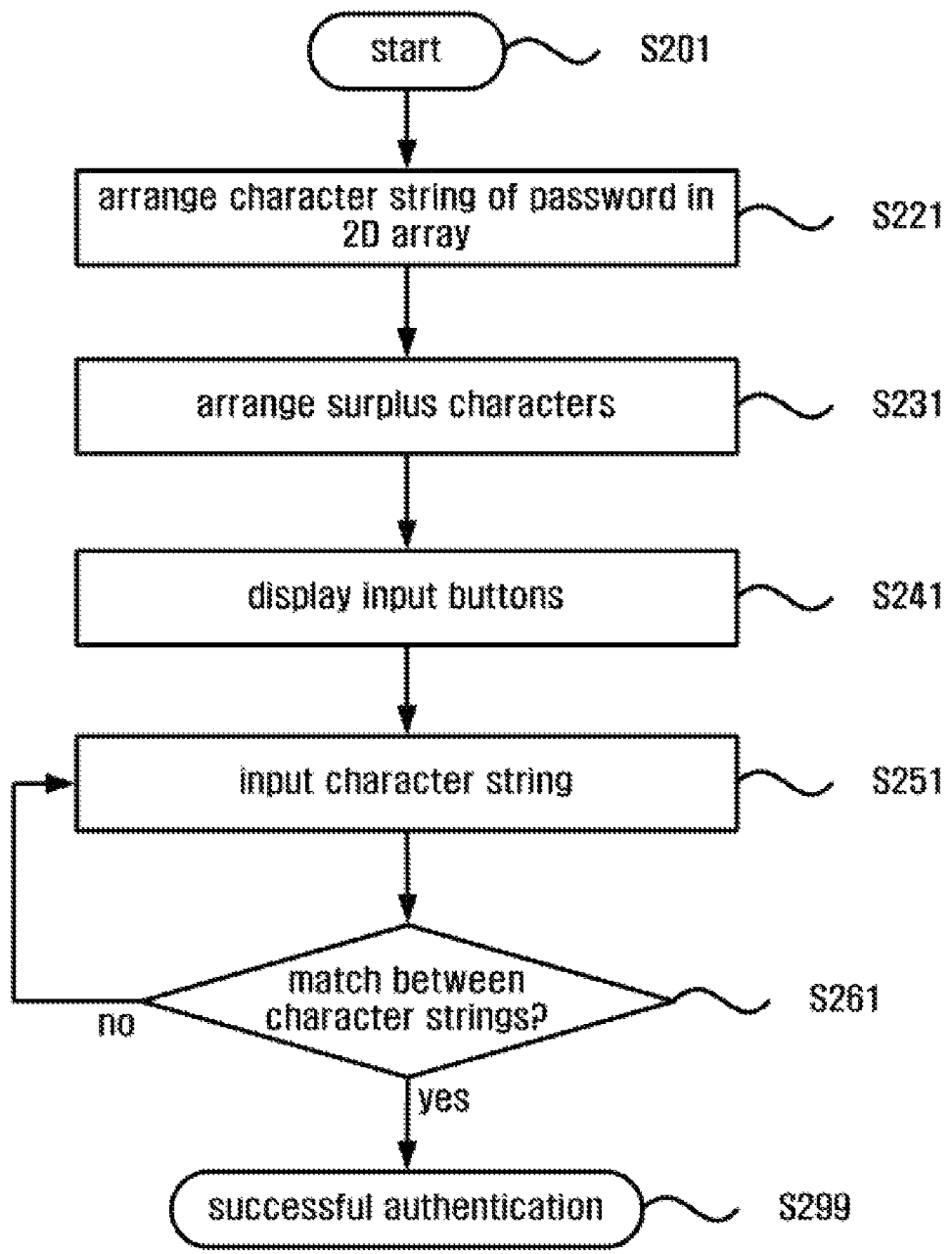
FIG. 2 is a flowchart illustrating the method for inputting a password into an electronic terminal according to the present invention.

FIG. 2 is a flowchart illustrating the method for inputting a password into an electronic terminal according to the present invention. First, a user sets a password via an input unit. In this case, the input password is composed of a string having a sequence, and is stored in the storage unit. When the user needs to perform user authentication while using the electronic terminal, the following steps will be performed by the control unit. The control unit provides a number of input buttons at least larger than the number of characters included in the character string of the password, in a 2D array. Characters should be assigned to the respective input buttons and randomly assigned whenever authentication is performed, and characters adjacent (successive) in the character string of the password should be arranged adjacent to each other in the above array at step S221. In this case, if any input button is not included in a rectilinear line (the rectilinear line does not pass over another input button) when two input buttons in the array are connected by the rectilinear line, the above two input buttons may be defined as being adjacent to each other in the array. A method for assigning characters to respective input buttons in a 2D array, wherein characters included in the character string of a password are arranged close to each other in the array, may be implemented in various ways.

First, a depth first search algorithm may be applied. In this case, a search is performed using a method in which a random input button in an array is set as a starting point, the search repeatedly proceeds to another adjacent input button, and, if the search cannot be performed any longer because there is no adjacent unvisited input button, the depth is reduced and then the process returns, and the search is performed until the length of a search path reaches the length of the character string of a password and is then terminated. In this case, the characters of the character string of the password are sequentially arranged on input buttons included in the search path. Furthermore, surplus characters that are not included in the character string of the password are randomly arranged on input buttons that are not included in the search path at step S231. Although the surplus characters may be extracted from a set in a specific range—the characters that constitute the character string of the password are included in the set, and an example of the set is the entire alphabet—and then arranged, they may be stored in the storage unit in the form of a surplus character string, that is, a set of characters that are set for the remaining input buttons that do not correspond to the character string of the password when the character string of the password is input by a user and set as a password. For example, if input buttons are nine in number and if, in the entire alphabet, the character string of a password is set as "a-c-e-r" and a surplus character string is set as "q, m, s, t, o," only a set of above characters is arranged even when characters are randomly arranged on the respective input buttons each time.

Figure 3:
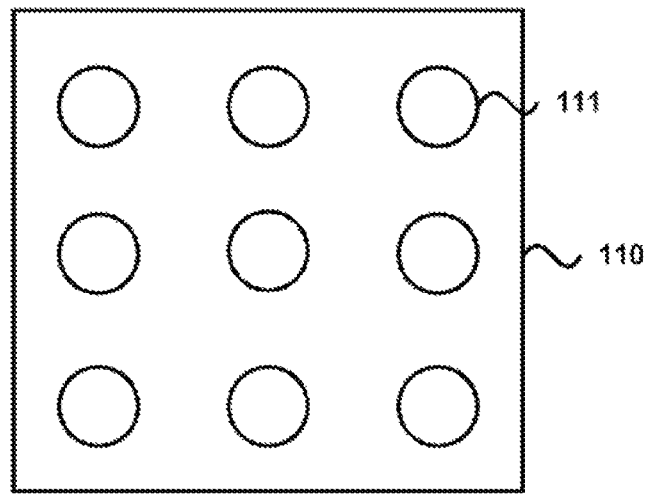
FIG. 3 is a diagram illustrating a 3*3 2D array that is used in the method for inputting a password into an electronic terminal according to the present invention.
Figure 4:
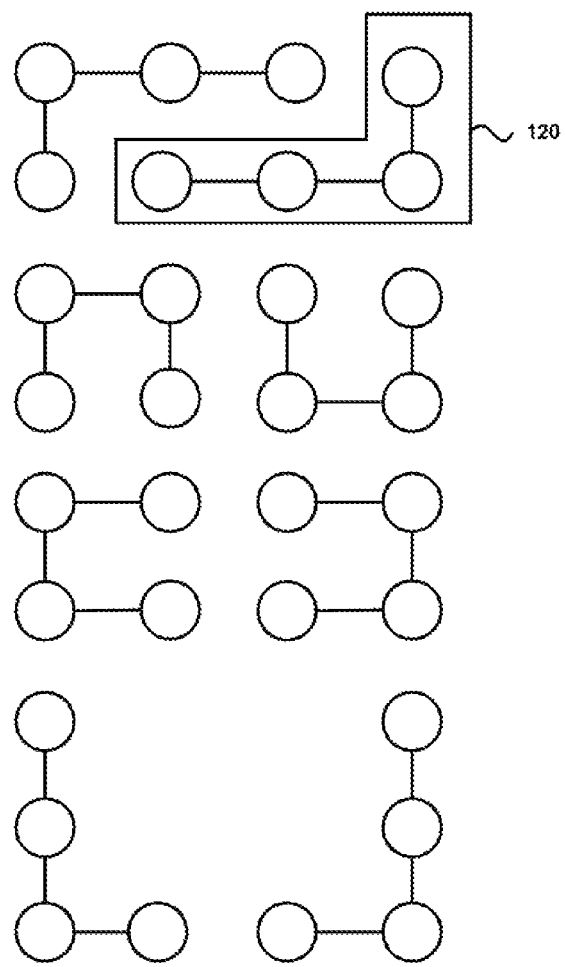
FIG. 4 is a diagram illustrating a collection of graph structures that may be included in a 3*3 2D array.
Figure 5:
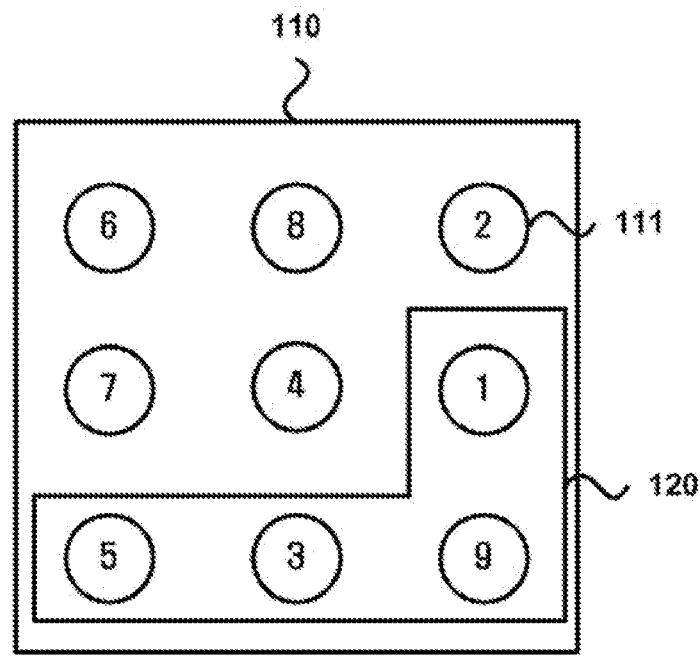
FIG. 5 is a diagram illustrating a state in which a selected graph structure has been applied to a 3*3 2D array.

In another method, various forms of graphs on which the character string of a password may be arranged are set in advance, one may be randomly selected from among the set graphs, a random region of a 2D array may be replaced with the selected graph, and the character string of the password may be arranged on the graph. For example, assume a case in which the character string of a password having a length of 4, such as "1-9-3-5," is arranged on a 2D array having a total of nine input buttons and a size of 3*3, as illustrated in FIG. 3. Since the character string of the password has a length of 4, various forms of graphs 120, such as those illustrated in FIG. 4, may correspond to the above 2D array, and these types of graphs are stored in the storage unit for each length of graphs. A random graph 120 is selected from the above graphs, the selected graph 120 is replaced with a random replaceable region of the 2D array, as illustrated in FIG. 5, and then the characters "1-9-3-5" included in the character string of the password are arranged on input buttons on which the graph 120 is disposed. Furthermore, surplus characters that are not included in the character string of the password may be randomly arranged on input buttons 111 in a region that is not included in the graph.

Figure 6:
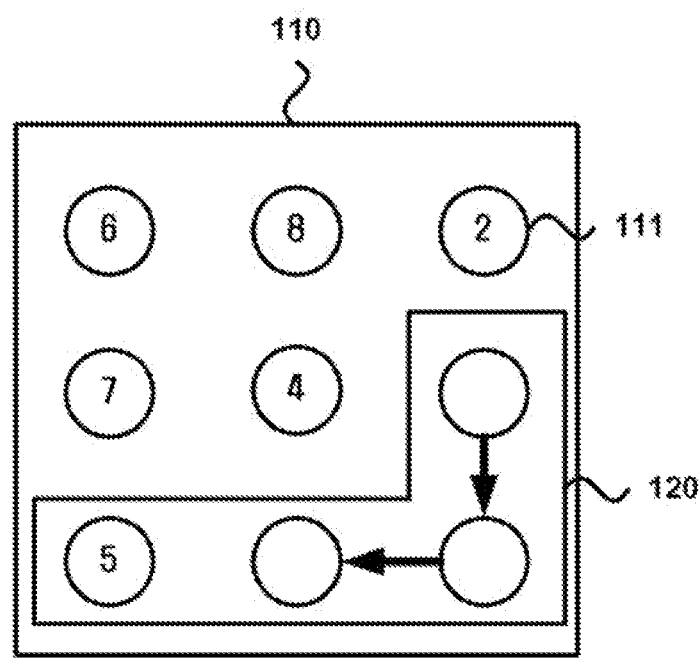
FIG. 6 is a diagram illustrating a state in which a user presses input buttons in a 3*3 2D array.

The input buttons of the 2D array arranged as described above are displayed by the display unit in a state in which the arranged characters are indicated at step S241. The user recognizes the character indicated on the respective input buttons and then inputs the memorized character string of the password at step S251. In this case, when a predetermined time has elapsed after the input buttons are first displayed, the display unit may erase the characters indicated on all the input buttons and then display only the shapes of the input buttons. This provides a genuine user with a time sufficient for the user to recognize the pattern of input buttons corresponding to the character string of the password, and allows another person to view only the input buttons having no characters and the same shape at the time at which the password is actually input even when the other person views an input process beside the user. Therefore, the characters that are actually input are not exposed to the other person. Furthermore, the next time a password is input, the character string of the same password is input, but the array is randomly changed as described above, with the result that it is impossible to infer the character string of the genuine password from the previously input pattern. In still another embodiment that can achieve the same effect, when the display unit displays input buttons indicative of respective arranged characters, the display unit may erase the characters indicated on all the input buttons if a user clicks on a "hide button" via the input unit, may erase the displayed characters if a user starts input by clicking on an input button, or may erase only one or more characters indicated on one or more input buttons on which a user has clicked, as illustrated in FIG. 6, thereby preventing immediately input characters from being exposed to another person.

The control unit compares the above input character string with the character string of the password to check whether they are the same at step S261. If they are the same, authentication is successful and a user authentication procedure is completed at step S299. If they are not the same, character input may be received from the user again at step S251.

Figure 7:
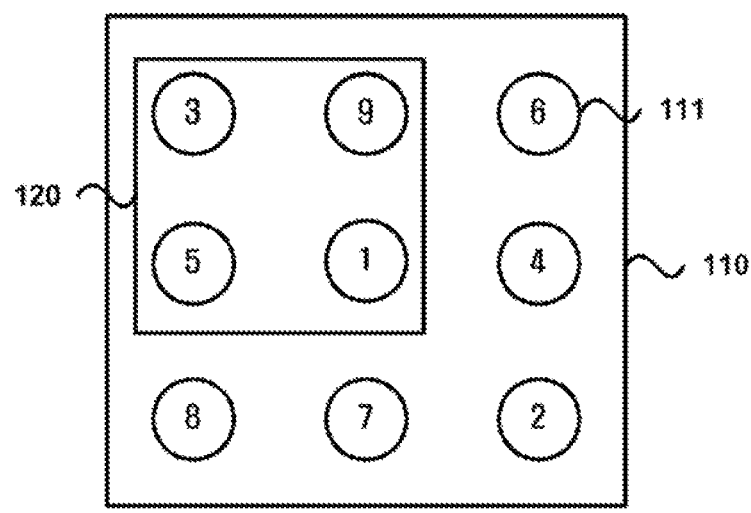
FIG. 7 is a diagram illustrating a state in which a graph structure selected in a way different from that of FIG. 5 has been applied to a 3*3 2D array.

In the above example, the input character strings of passwords are "1-9-3-5" and the same. However, the next time a plurality of input buttons are displayed in a 2D array, an entirely different pattern is displayed, as illustrated in FIG. 7. A chance that another person easily guesses or infers the character string of the password becomes unlikely.

Since it is not easy to form an array of input buttons if the character string of a password is lengthy, it may be possible to divide the character string of the password into at least two or more character strings and successively receive the character strings. For example, if the character string of a password is "1-2-3-4-5-6-7-8," the character string is divided into the first character string "1-2-3-4" of the password and the second character string "5-6-7-8" of the password, an array of input buttons is formed and displayed so that a user can input the character string "1-2-3-4" of the password, and the character string is received. Authentication is performed by comparing the input character string with the first character string of the password. If the authentication is successful, an array of input buttons is formed and displayed so that the user can input the character string "5-6-7-8" of the password, and the character string is received. The case where the lengthy character string of a password is input in such a way as to divide the character string of the password into at least two strings and successively authenticate these strings has the advantage of easily forming adjacent arrays of input buttons and the advantage of minimizing the possibility of exposing the password to another person during a password input process because the array of input buttons is changed at least once while the character string of the password is being received.

Figure 8:
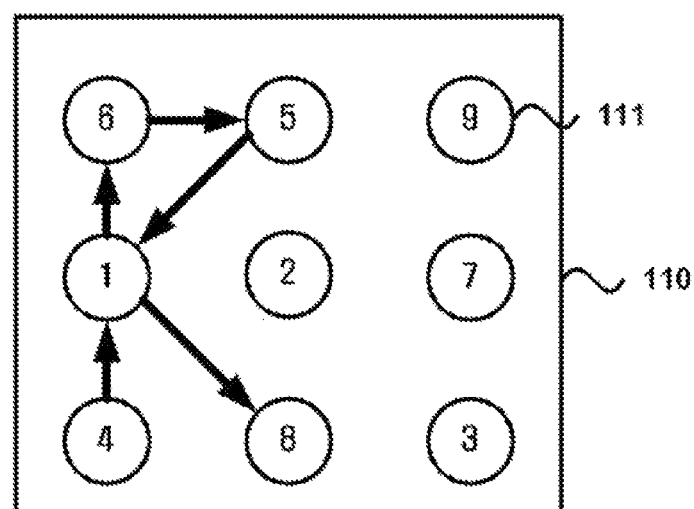
FIG. 8 is a diagram illustrating a 3*3 2D array to which a method for inputting a password into an electronic terminal, wherein the repetitions of one or more characters are possible, has been applied.

According to an embodiment of the present invention, the character string of a password may include one or more repeated characters. For example, if the character string of a password is "4-1-6-5-1-8," 1 appears twice. In this case, a shape in which the character string of a password is arranged may include one or more rings in addition to one or more lines, as illustrated in FIG. 8. Even in this case, it is possible to arrange the character string of the password in a 2D array composed of a plurality of input buttons using the above-described algorithm.

Figure 9:
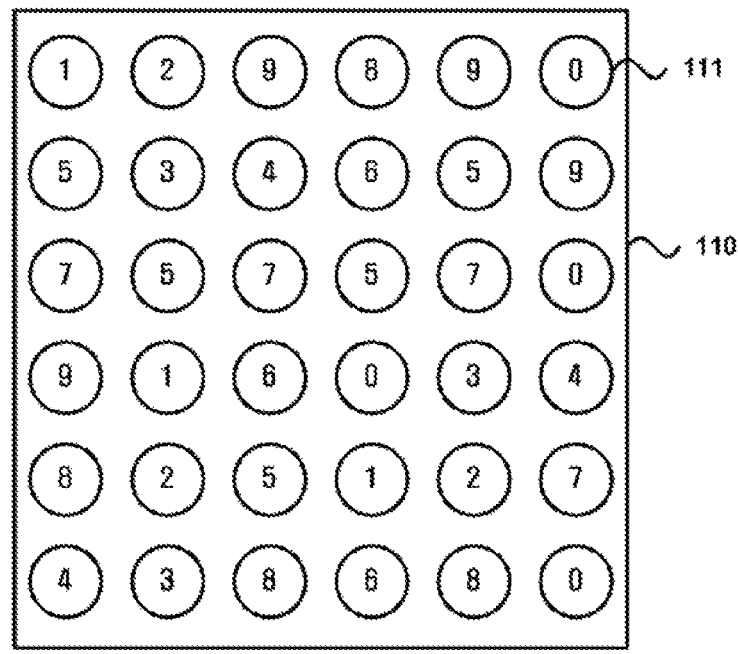
FIG. 9 and FIG. 10 are diagrams illustrating an array that is used in the method for inputting a password into an electronic terminal according to the present invention.
Figure 10:
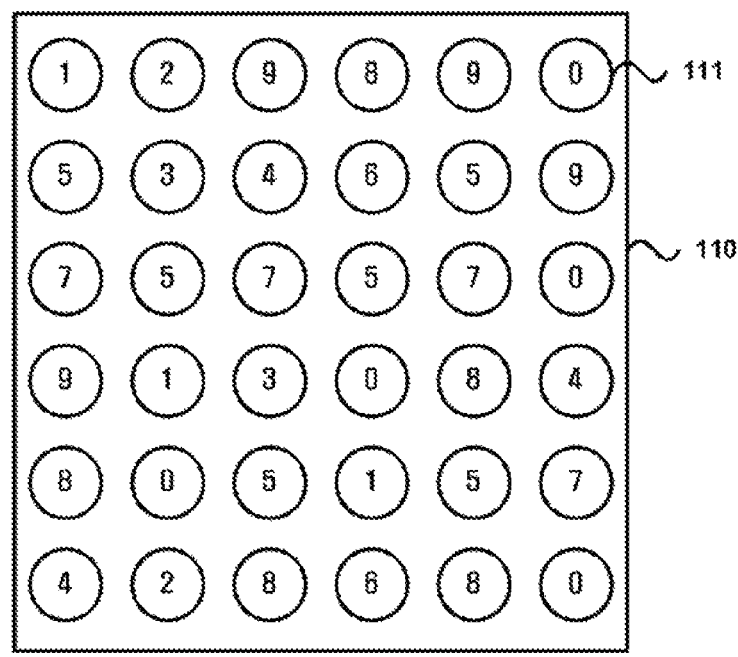

Furthermore, each of the characters of one or more input buttons may appear at least twice. As illustrated in FIG. 9, if an array includes a total of 36 input buttons, "1" may appear three times, "2" may appear three times, and "3" may appear three times. In this case, if the character string of a password is "1-2-3-4," cases in which the character string of the password can be input using adjacent input buttons are 3 in number. It may be possible to determine that all these three cases correspond to normal password input. However, in order to determine that only one of these three cases corresponds to normal password input, it may be possible to make it impossible to input the character string of the password input using the other combinations of adjacent input buttons by adjusting the other two arrays, as illustrated in FIG. 10.

According to an embodiment of the present invention, the color of the starting character of the character string of a password may differ from that of the other characters. For example, if the character string of a password is "4-1-6-5-1-8," is displayed in a color different from that of the other characters so that a user can easily find the starting point "4" from among a plurality of character strings. Alternatively, at least two characters are displayed in a color different from that of the other characters, in which case the at least two characters displayed in the different color may be set such that they include a starting character. This case can guide a user to a starting point so that the user can considerably easily find the starting point, and can also minimize the exposure of a password to another person.

It will be appreciated by those having ordinary knowledge in the field of art to which the present invention pertains that the present invention can be practiced in other specific forms without changes to the technical spirit or essential features of the present invention. Therefore, it should be understood that the above-described embodiments are illustrative, not restrictive, in every aspect. The scope of the present invention is defined by the ranges of the following claims, rather than the detailed description. All variations and modifications derived from the meanings and ranges of the claims and the equivalents thereof should be interpreted as being included in the scope of the present invention.

What is claimed is:

1. A method for inputting a password into an electronic terminal, comprising the steps of:
   (a) receiving, by an input unit, a character string of a password from a user, and storing the character string of the password in a storage unit;
   (b) randomly arranging, by a control unit, characters included in the character string of the password on two-dimensionally arranged input buttons wherein the number of the input buttons is larger than a number of characters included in the character string of the password, wherein adjacent characters in the character string of the password are arranged on adjacent input buttons—the adjacent input buttons being two input buttons that can be connected by a rectilinear line without intervention of another input button;
   (c) arranging, by the control unit, one or more characters that are not included in the character string of the password on the input buttons on which characters that are included in the character string of the password have not been arranged;
   (d) displaying, by a display unit, the input buttons on which the respective arranged character are indicated;
   (e) receiving, by the input unit, an input character string from a user; and
   (f) completing, by the control unit, a user authentication procedure if the character string of the password is identical to the input character string.

2. The method of claim 1, wherein the character string of the password comprises one or more repeated characters.

3. The method of claim 1, wherein:
   step (a) comprises the step of storing, by the control unit, a surplus character string composed of characters that are not included in the character string of the password in the storage unit;
   step (c) comprises arranging, by the control unit, characters included in the surplus character string on input buttons on which characters included in the character string of the password have not been arranged.

4. The method of claim 1, wherein step (d) comprises the step of erasing, by the display unit, characters indicated on all the input buttons when a predetermined time has elapsed after the input buttons are first displayed, and displaying the input buttons.

5. The method of claim 1, wherein step (d) comprises the step of erasing, by the display unit, characters indicated on all the input buttons when the input unit receives an input regarding a "hide button" from the user, and displaying the input buttons.

6. The method of claim 1, wherein step (e) comprises the step of receiving, by the input unit, the input character string from the user, and erasing, by the display unit, a character indicated on each of the input buttons corresponding to the input character string whenever the input button is pressed and displaying the input buttons.

7. The method of claim 1, wherein step (e) comprises the step of erasing, by the display unit, characters indicated on all the input buttons when the input unit receives an input regarding a random input button from the user and displaying the input buttons.

8. The method of claim 1, wherein:
   step (b) comprises:
   the step of selecting, by the control unit, any one from among a plurality of preset graph structures—each of the preset graph structures being included in a two-dimensional (2D) array including a number of input buttons larger than a number of characters included in the string of the password, and having the length of the number of characters included in the character string of the password; and
   the step of arranging, by the control unit, the characters included in the character string of the password on the selected graph structure, wherein adjacent characters in the character string of the password are arranged on adjacent input buttons—the adjacent input buttons being two input buttons that can be connected by a rectilinear line without intervention of another input button; and step (c) comprises:

the step of, locating, by the control unit, the graph structure on the 2D array of input buttons; and the step of arranging, by the control unit, characters that are not included in the character string of the password on the input buttons on which the characters that are included in the character string of the password have not been arranged.

\* \* \* \* \*